United States Patent
Marinkovich et al.

(10) Patent No.: US 7,096,590 B2
(45) Date of Patent: Aug. 29, 2006

(54) RECIPROCATING SAW

(75) Inventors: Dragomir C. Marinkovich, Hales Corners, WI (US); Roger D. Neitzell, North Prairie, WI (US); Thomas P. James, Oconomowoc, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 10/914,965

(22) Filed: Aug. 10, 2004

(65) Prior Publication Data
US 2005/0005458 A1    Jan. 13, 2005

Related U.S. Application Data

(60) Division of application No. 10/118,856, filed on Apr. 9, 2002, now Pat. No. 6,772,662, which is a continuation-in-part of application No. 09/832,242, filed on Apr. 10, 2001, now Pat. No. 6,742,267, which is a continuation-in-part of application No. 09/169,509, filed on Oct. 9, 1998, now Pat. No. 6,212,781.

(51) Int. Cl.
*B27B 19/04* (2006.01)

(52) U.S. Cl. .................................................. 30/392
(58) Field of Classification Search ............... 30/392, 30/393, 394; 74/55, 56, 57, 58; 173/176, 173/178; 464/182
See application file for complete search history.

(56) References Cited

U.S. PATENT DOCUMENTS

| 1,035,524 A | 8/1912 | Bradley |
|---|---|---|
| 1,666,539 A | 4/1928 | Michell |
| 2,084,321 A | 6/1937 | Corradino et al. |
| 2,563,789 A | 8/1951 | Kurtz et al. |
| 2,736,203 A | 2/1956 | Shore |
| 2,793,661 A | 5/1957 | Olson |
| 2,830,456 A | 4/1958 | Stafford |
| 3,080,897 A | 3/1963 | Winter |
| 3,206,989 A | 9/1965 | Enders |
| 3,280,683 A | 10/1966 | Djurberg |
| 3,585,719 A | 6/1971 | Kivela |
| 3,596,525 A | 8/1971 | Niesz |
| 3,802,079 A | 4/1974 | Ketchpel, Jr. et al. |
| 3,945,120 A | 3/1976 | Ritz |
| 4,031,763 A | 6/1977 | Eisenberg |
| 4,125,033 A | 11/1978 | Riedl |
| 4,989,488 A | 2/1991 | Potzsch |
| 5,007,172 A | 4/1991 | Palm |
| 5,025,562 A | 6/1991 | Palm |

(Continued)

FOREIGN PATENT DOCUMENTS

CH         256612        8/1948

(Continued)

*Primary Examiner*—Charles Goodman
(74) *Attorney, Agent, or Firm*—Michael Best & Friedrich LLP

(57) ABSTRACT

A reciprocating saw including a housing, a motor supported by the housing, a spindle mounted for reciprocation relative to the housing and having a front end for supporting a saw blade, the spindle being movable through a cutting stroke and a return stroke, the cutting stroke having a stroke length, and a pivot body interconnecting the spindle and the motor. The position of the pivot axis of the pivot body may be movable relative to the housing to change the stroke length of the spindle. A shock absorber may be operatively positioned between the motor and the front end of the spindle and may be at least partially mounted within the spindle.

4 Claims, 17 Drawing Sheets

U.S. PATENT DOCUMENTS

| | | |
|---|---|---|
| 5,050,307 A | 9/1991 | Palm |
| 5,078,017 A | 1/1992 | Zornes |
| 5,079,844 A | 1/1992 | Palm |
| 5,134,777 A | 8/1992 | Meyer et al. |
| 5,450,925 A | 9/1995 | Smith et al. |
| RE35,258 E | 6/1996 | Palm |
| 5,566,458 A | 10/1996 | Bednar |
| 5,607,023 A | 3/1997 | Palm |
| 5,607,265 A | 3/1997 | Lane |
| 5,689,891 A | 11/1997 | Bednar et al. |
| 5,782,000 A | 7/1998 | Bednar |
| 5,924,209 A | 7/1999 | Ward |
| 5,946,810 A | 9/1999 | Hoelderlin et al. |
| 6,012,346 A | 1/2000 | Vo |
| 6,021,573 A | 2/2000 | Kikuchi |
| 6,212,781 B1 * | 4/2001 | Marinkovich et al. ........ 30/394 |
| 6,772,662 B1 * | 8/2004 | Marinkovich et al. ......... 83/34 |

FOREIGN PATENT DOCUMENTS

| | | |
|---|---|---|
| DE | 27 49 875 | 5/1979 |
| GB | 2 048 420 | 12/1980 |
| JP | 06 254715 | 9/1994 |
| WO | WO 00 21 707 A | 4/2000 |

* cited by examiner

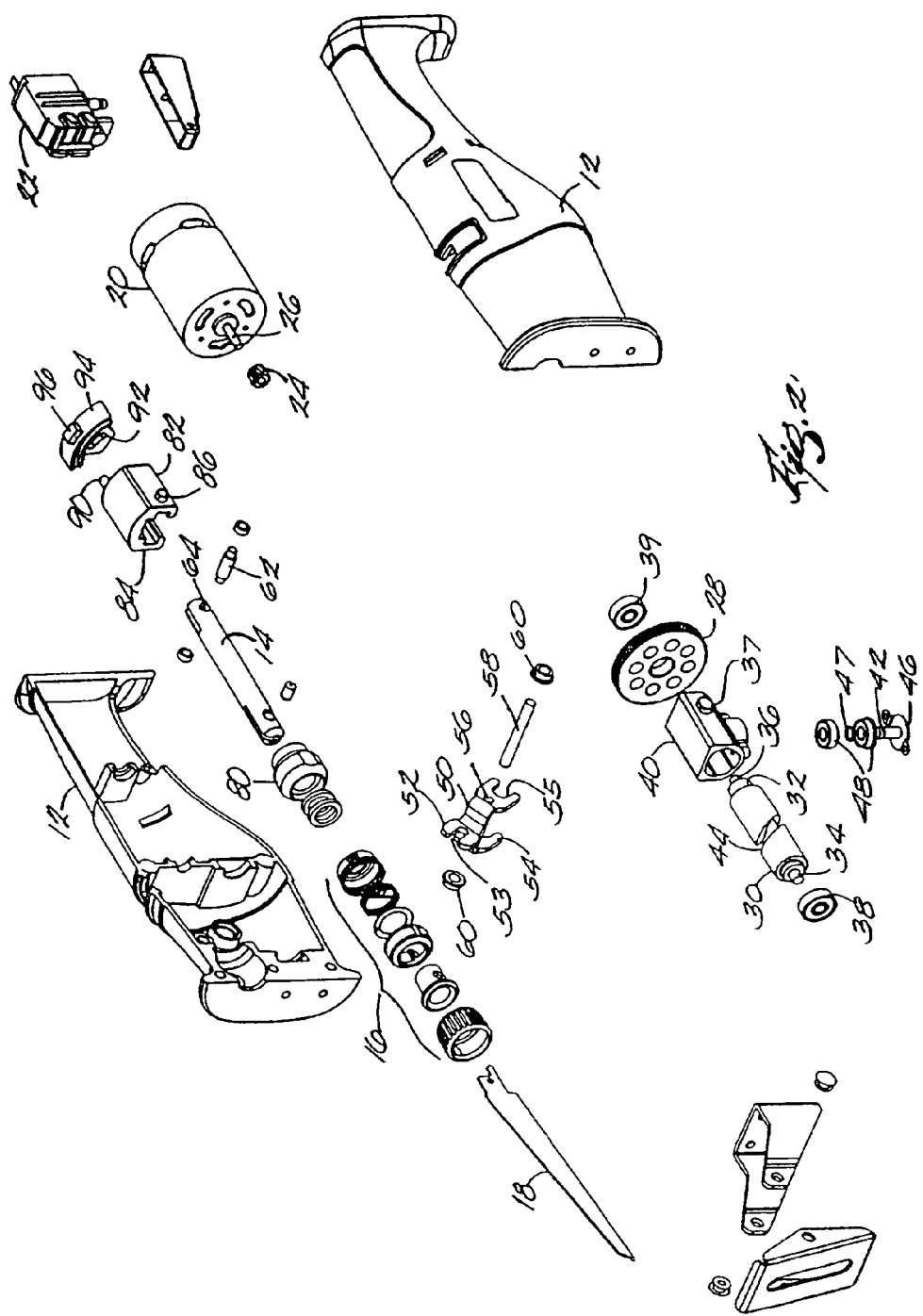

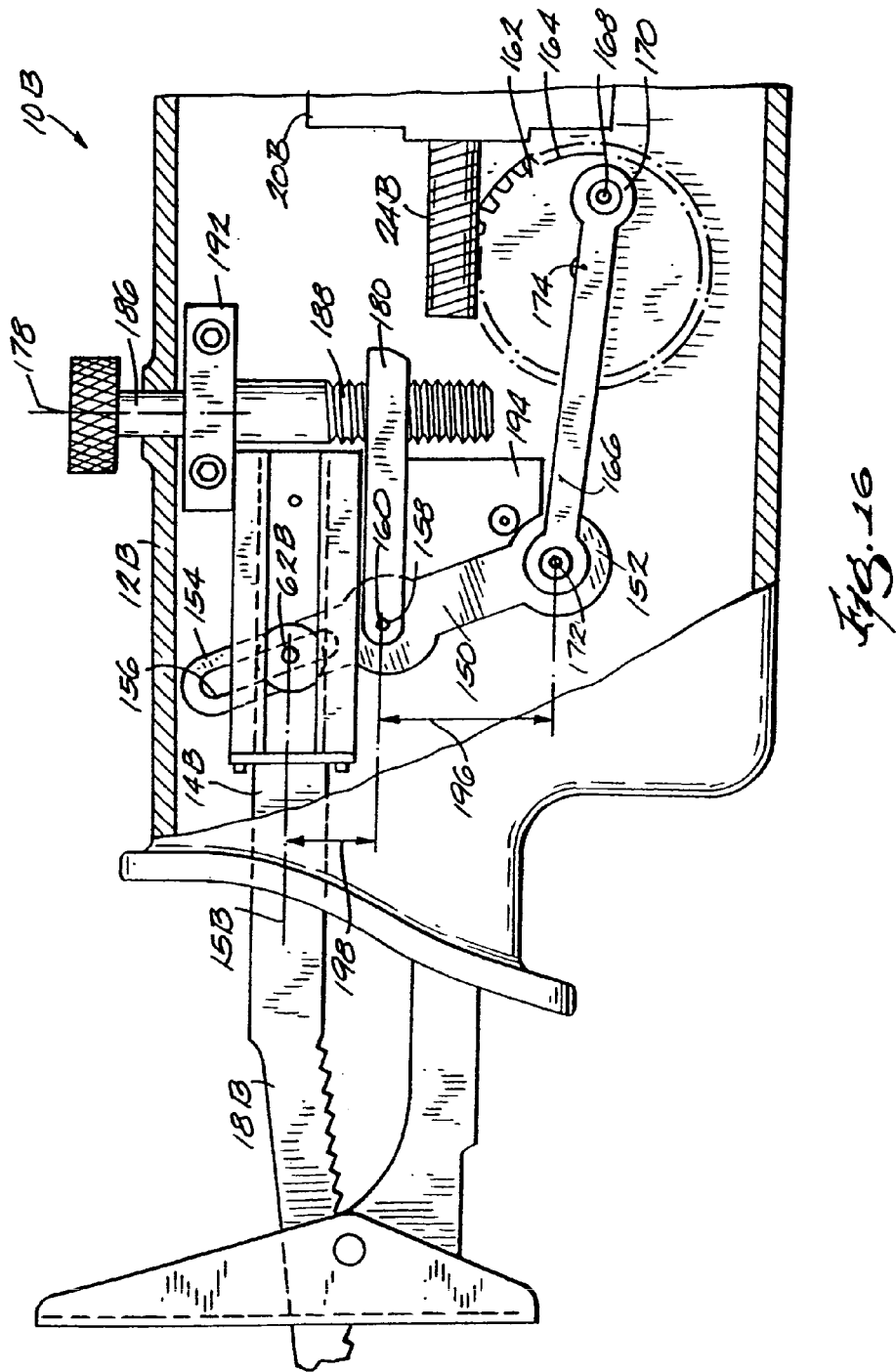

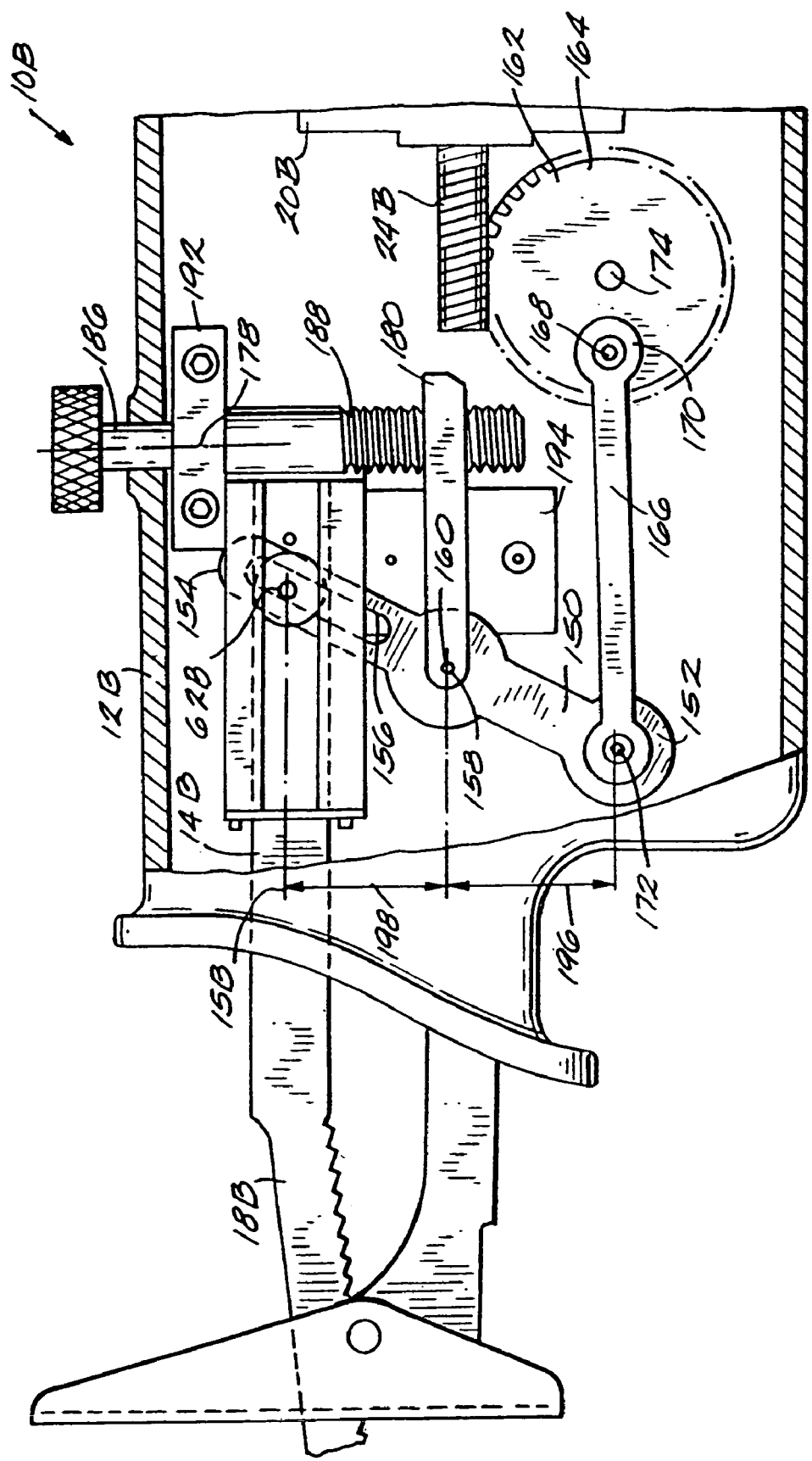

RECIPROCATING SAW

RELATED APPLICATIONS

The present application is a divisional of application Ser. No. 10/118,856, filed Apr. 9, 2002, now U.S. Pat. No. 6,772,662, which is a continuation-in-part of application Ser. No. 09/832,242, filed Apr. 10, 2001, now U.S. Pat. No. 6,742,267, issued Jun. 1, 2004, which is a continuation-in-part of application Ser. No. 09/169,509, filed Oct. 9, 1998, now U.S. Pat. No. 6,212,781, issued Apr. 10, 2001.

FIELD OF THE INVENTION

The invention relates to reciprocating saws and, more particularly, to the drive mechanisms of reciprocating saws.

BACKGROUND OF THE INVENTION

Reciprocating saws are used to cut a variety of objects, such as metal pipes, wood and drywall. Such saws typically include a housing and a spindle mounted in the housing for reciprocating motion along an axis that is parallel to the longitudinal extent of the spindle. An electric motor provides power to the spindle through a mechanical reciprocating device that converts the rotary motion of a motor shaft to reciprocating motion of the spindle. Such mechanical reciprocating devices can, for example, include an eccentric drive, as disclosed in U.S. Pat. No. 5,079,844, or a wobble plate drive, as disclosed in U.S. Pat. Nos. 5,025,562 and 5,050,307.

In addition to various types of drive mechanisms, there are also various types of reciprocating motion. For example, the simplest type is straight linear motion, in which the spindle and blade are translated along a linear path parallel to the spindle and returned along the same path. Alternatively, rocking motion is motion in which the spindle and blade are translated and returned along a path oblique to the spindle axis. Such motion may be straight or curved, and may help to drive the saw blade into the workpiece on the cutting stroke and retract the blade on the return stroke. As another alternative, orbital motion is motion in which the spindle and saw blade are translated along a cutting path and returned along a different path. Typically, the paths form a loop-type movement that forces the saw blade into the workpiece on the cutting stroke and then lifts the saw blade off the workpiece on the return stroke. All of these types of movement involve some reciprocation of the saw blade and are therefore considered to be a form of reciprocating motion.

SUMMARY OF THE INVENTION

Incorporation of a counterbalance into prior art mechanical reciprocating devices, such as eccentric drives and wobble plate drives, can be complex and expensive. Further, the introduction of additional mechanisms into the devices can create another potential point of failure. Accordingly, it is an independent object of the present invention to design a saw that provides an improved drive mechanism without necessarily adding weight, cost, or complexity. It is a related but independent object of the present invention to provide a reciprocating saw drive mechanism that may be inherently counterbalanced, i.e., the counterbalance is integral to the drive mechanism itself, thus not requiring additional moving parts. It is a further independent object of the present invention to provide a drive mechanism that incorporates a shock absorbing feature without adding significant weight, cost, or expense.

In accordance with one or more of these and other objectives, the invention provides a reciprocating saw comprising a housing, a spindle mounted for reciprocation relative to the housing, a motor for moving the spindle in a reciprocating fashion, and a reciprocating member interconnecting the motor with the spindle. The reciprocating member is adapted to move in a direction that is at least partially opposed to the direction of the spindle movement, and the motor and the spindle define a drive force path from the motor to the spindle, and at least part of the reciprocating member is in the drive force path. The reciprocating member may thereby be configured to counterbalance movement of the spindle. For example, the reciprocating member may have substantially the same mass as the spindle.

In one embodiment, the reciprocating member defines an axis and the spindle defines an axis, and the reciprocating member axis is offset from the spindle axis. The reciprocating member axis may be substantially parallel to the spindle axis. The reciprocating saw may further comprise a drive shaft that is driven by the motor wherein the reciprocating member is driven by the drive shaft. For example, the reciprocating member may comprise a barrel cam.

In one aspect, the saw can further include an actuating member in the form of a pivot body having a first end interconnected with the spindle and a second end driven by the motor. The pivot body can be mounted at a pivot point between the first and second ends. The pivot body may be movable perpendicular to pivot axis to thereby vary the extent to which the spindle is driven.

In yet another aspect, the saw includes a shock absorber mounted on the spindle and operatively positioned between the motor and the front end to at least partially absorb impact to the front end. The shock absorber may interconnected between the front end and an actuating member, and may be at least partially mounted within the spindle. Preferably, the shock absorber comprises an elastomeric cushion.

BRIEF DESCRIPTION OF THE DRAWINGS

FIG. 9 is a side view of the reciprocating saw, shown in partial cross-section.

FIG. 18 is a side view of the reciprocating saw of FIG. 12 configured for an intermediate stroke length, with the spindle in the forward position.

FIG. 19 is a side view of the reciprocating saw of FIG. 12 configured for an intermediate stroke length, with the spindle in the rearward position.

Figure 1:
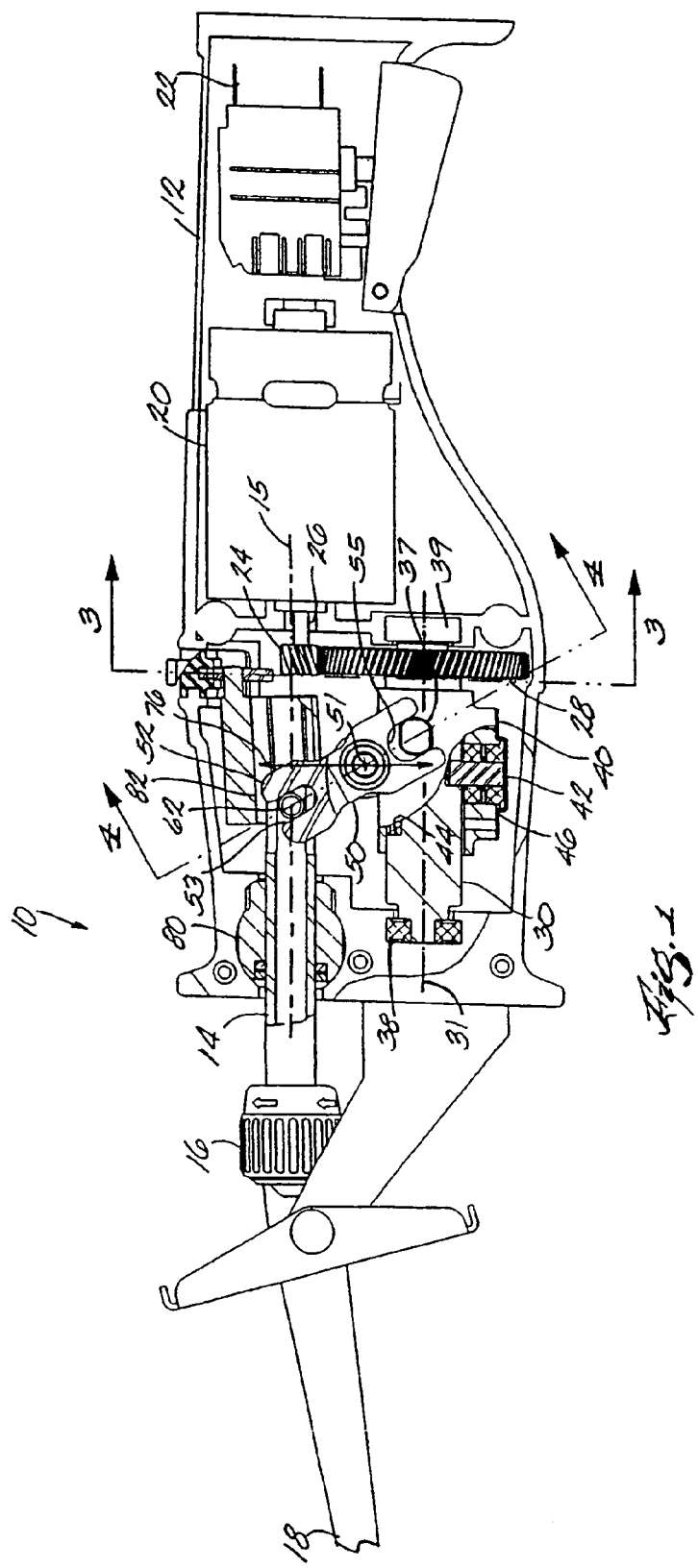
FIG. 1 is a side view of a reciprocating saw according to the present invention, shown in partial cross-section.

Before one embodiment of the invention is explained in detail, it is to be understood that the invention is not limited in its application to the details of the construction and the arrangements of processes set forth in the following description or illustrated in the drawings. The invention is capable of other embodiments and of being practiced or being carried out in various ways. Also, it is understood that the phraseology and terminology used herein is for the purpose of describing the illustrated embodiment and should not be regarded as limiting the scope of the invention.

DETAILED DESCRIPTION OF THE PREFERRED EMBODIMENT

Referring to the drawings, FIG. 1 shows a reciprocating saw 10 according to the present invention. Some components of the reciprocating saw 10 may be similar or identical to components shown in U.S. patent application Ser. No. 08/699,448, filed Aug. 19, 1996, which is herein incorporated by reference.

The reciprocating saw 10 generally includes a housing 12 that is configured to house the drive components at the front end and to fit an operator's hand at the rear end. The housing is split in two halves (FIG. 2), which are combined when the saw 10 is assembled. At the front end of the reciprocating saw 10 is a saw blade 18 mounted to a spindle 14 that reciprocates within the saw 10. Specifically, the saw blade 18 is mounted within a blade clamp 16 at the front end of the spindle 14. Such a blade clamp is shown and described in pending International Application No. PCT/US97/03633, which claims the benefit of U.S. Provisional Application Ser. No. 60/021,470, both of which are herein incorporated by reference.

In the configuration shown in FIG. 1, the saw blade 18 is oriented such that the serrations will face downward. Thus, the saw blade 18 is configured for downcutting. In some cases, it may be beneficial to reverse the saw blade 18 such that the teeth of the saw blade 18 face upward, thereby configuring the saw for upcutting. The spindle 14, the spindle drive mechanism, and the spindle clamp 16 may be suitably adapted to saw in both directions. Further, the type of motion of the saw blade 18 and the spindle 14 may be varied to make the motion of the saw blade 18 more suitable to upcutting or downcutting, as described hereinafter in further detail.

The spindle 14 reciprocates in a generally forward and rearward direction, and defines a spindle axis 15 through the center of the spindle 14. The saw blade 18 is reciprocated and thereby moved through a cutting stroke in one direction and a return stroke in a substantially opposite direction. A motor 20 powers the drive mechanism of the reciprocating saw 10 and moves the saw blade 18 through the cutting stroke and the return stroke. Power from the motor 20 passes through a number of drive components before being transferred to the saw blade 18. These drive components thereby define a drive force path that includes those drive components, or those portions of drive components, that carry a drive force from the motor 20 through to the spindle 14 and to the saw blade 18.

The motor 20 is fixedly mounted within the housing 12. The motor 20 may be externally powered or, as shown in FIG. 1, may include a plug 22 for a battery (not shown) that provides power to the motor 20. The motor 20 drives a motor pinion 24 through a motor shaft 26. The motor pinion 24 engages and drives a drive gear 28.

Figure 2:
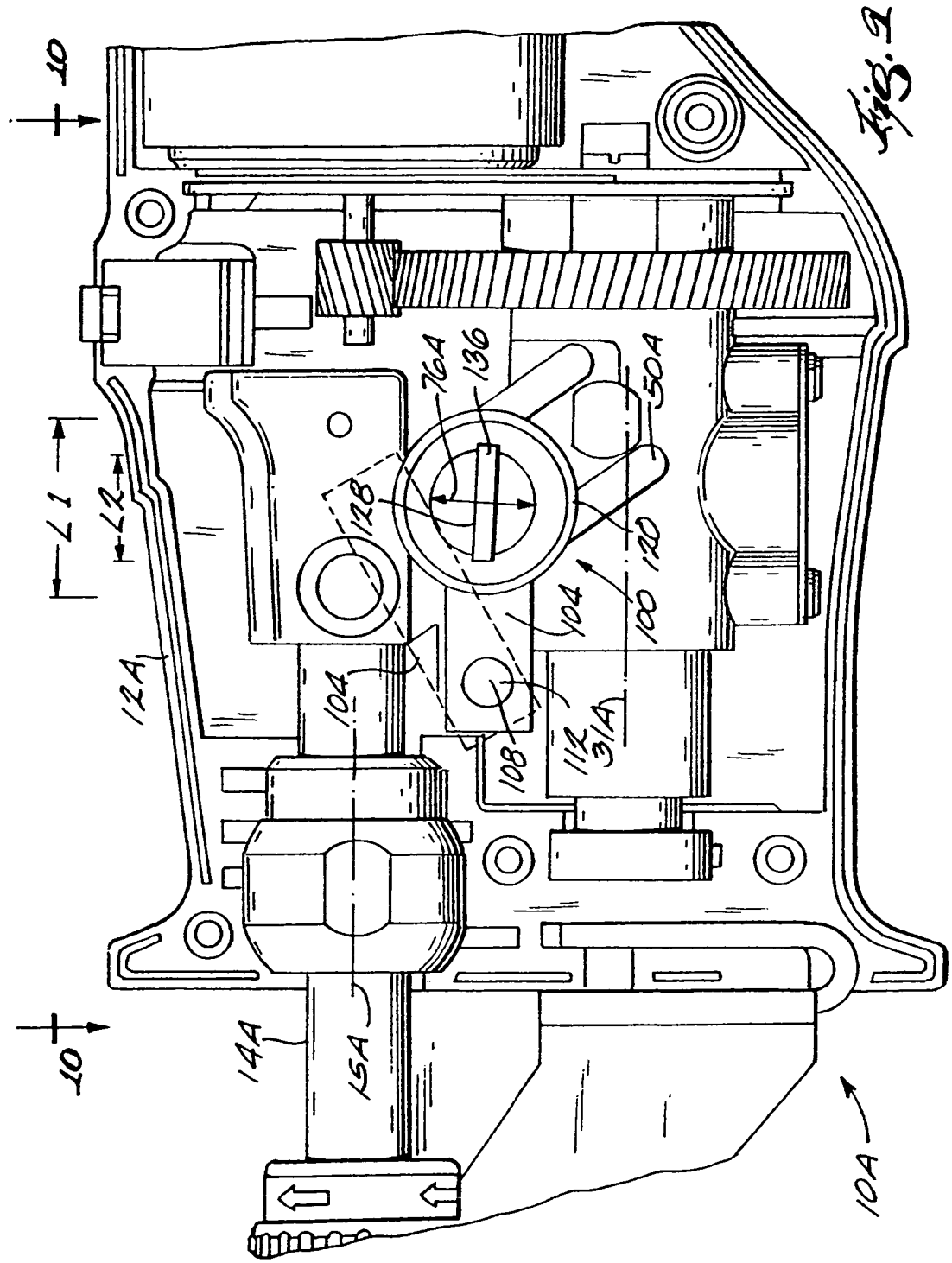
FIG. 2 is a perspective view of the reciprocating saw, exploded to show individual components.

The drive gear 28 is coaxially mounted to a drive shaft 30. The drive gear 28 and the drive shaft 30 thereby define a drive axis 31. As shown in FIG. 2, the drive shaft 30 includes a shoulder 32 that is sized to fit the inner diameter of drive gear 28. The drive shaft 30 is reduced in diameter at a first end 34 and a second end 36. The first end 34 and the second end 36 are adapted to fit within a front bearing 38 and a rear bearing 39, respectively, that are fixedly mounted by their outer races inside the housing 12. Such bearings may be, for example, radial cartridge bearings.

As shown in FIGS. 1 and 2, a reciprocator body 40 fits over the drive shaft 30. The reciprocator body 40 translates the rotary motion of the drive shaft 30 to reciprocating motion. The reciprocator body 40 interacts with the drive shaft 30 by means of a drive pin 42 within a groove 44 of drive shaft 30. The drive pin 42 is held in a fixed position relative to the reciprocator body 40 by a pin retainer cup 46. The drive pin 42 is freely rotatable relative to the reciprocator body 40 and the pin retainer cup 46.

Two embodiments of the drive pin configuration are shown in the drawings. In the first embodiment, shown in FIGS. 1 and 2, a single drive pin 42 rides within a single groove 44. In the second embodiment, shown in FIGS. 6 and 7, a drive pin 42' and a follower pin 43' ride within a groove 44' and a follower groove 45', respectively. The follower pin 43' functions to more precisely locate the reciprocator body 40' relative to the drive shaft 30' and thereby prevent backlash. As shown in FIG. 7, the follower pin 43' preferably has a frustoconical tip, and the follower groove 45' is frustoconical in cross-sectional shape to receive the frustoconical tip. A further difference between the two illustrated embodiments is that in the first embodiment of FIGS. 1 and 2, the drive pin 42 rotates on bearings 48 separated by spacer 47. In the second embodiment of FIGS. 6 and 7, the drive pin 42' and the follower pin 43' rotate on bushings 49', such as sintered brass bushings, that separate the pins from the pin retainer cup 46'.

As one skilled in the art would recognize, the drive pin 42 will preferably be free to rotate relative to the pin retainer cup 46. Thus, the end of the drive pin 42 that rides within the groove 44 is preferably slightly smaller in size than the groove 44. The drive pin 42 will therefore roll along the sidewalls of the groove 44.

The pin retainer cup 46 may comprise a separate assembly that houses the drive pin 42 and is attached to the reciprocator body 40. Alternatively, the pin retainer cup 46 may, as shown in FIG. 2, comprise a plate that is attached at the end of the pin retainer cup to contain the drive pin 42. Such a plate or the entire pin retainer cup 46 may be affixed to the reciprocator body 40 by means of fasteners in order to permit disassembly and repair.

FIGS. 1 and 2 illustrate that the reciprocator body 40 includes a pair of the reciprocator pins 37 that extend from the side of the reciprocator body 40. As shown in the cross section of FIG. 4, the reciprocator pins 37 are reflected on both sides of the reciprocator body 40. The reciprocator pins 37 are generally cylindrical and have flattened top and bottom sides.

The reciprocator pins 37 of the reciprocator body 40 engage a pivot body 50. The pivot body 50 transfers the drive force to the spindle 14, and thus functions as an actuating member of the spindle 14. The pivot body 50 is pivotally mounted within the housing 12, and pivots about pivot axis 51.

Figure 4:
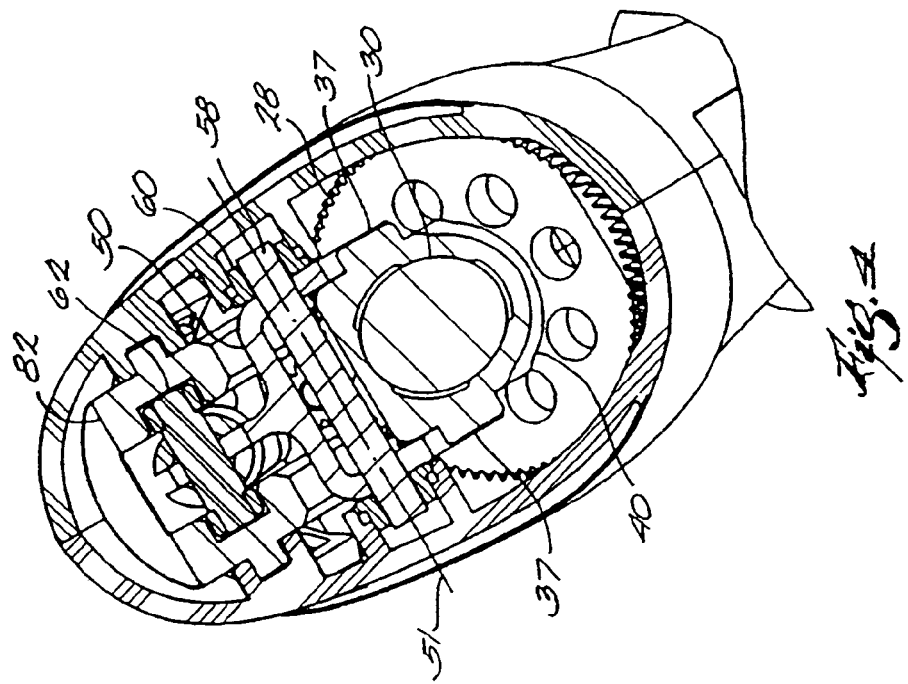
FIG. 4 is a cross-sectional view along line 4—4 of FIG. 1.
Figure 3:
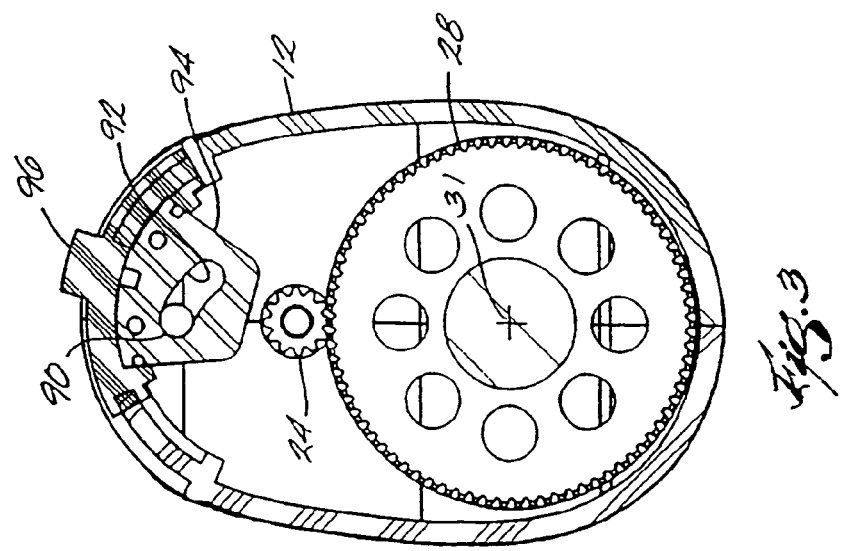
FIG. 3 is a cross-sectional view along line 3—3 of FIG. 1.

In the first embodiment shown in FIGS. 1 and 2, the pivot body 50 is generally Y-shaped and includes a first end 52 that engages the spindle 14, and a second end 54 that engages the reciprocator body 40. As best shown in FIGS. 2 and 4, the second end 54 includes two portions that are offset from the central axis of the reciprocating saw 10 and engage the two reciprocator pins 37 on either side of reciprocator body 40. The pivot body 50 further includes a pair of apertures 56 (FIG. 2) on either side of the pivot body 50, the apertures being configured to receive a pivot pin 58. The ends of pivot pin 58 are mounted within bushings 60 that are mounted within the housing 12.

The first end 52 includes an open slot 53 for engaging the spindle, and the second end 54 includes an open slot 55 on each side to engage the reciprocator pins. As the pivot body 50 pivots, and as the corresponding pins that are engaged within the slots 53, 55 reciprocate, the distance of the corresponding pins to the pivot axis 51 of the pivot body 50 changes. Therefore, an elongated slot is desired in the illustrated embodiment.

The first end 52 of the pivot body 50 engages spindle 14 by means of a spindle pin 62. The spindle pin 62 is cylindrical and engages the slot 53 in the first end 52. As FIG. 2 more clearly shows, the spindle pin 62 passes through an aperture 64 in the spindle 14, and the spindle pin 62 engages the walls of the aperture 64.

Figure 6:
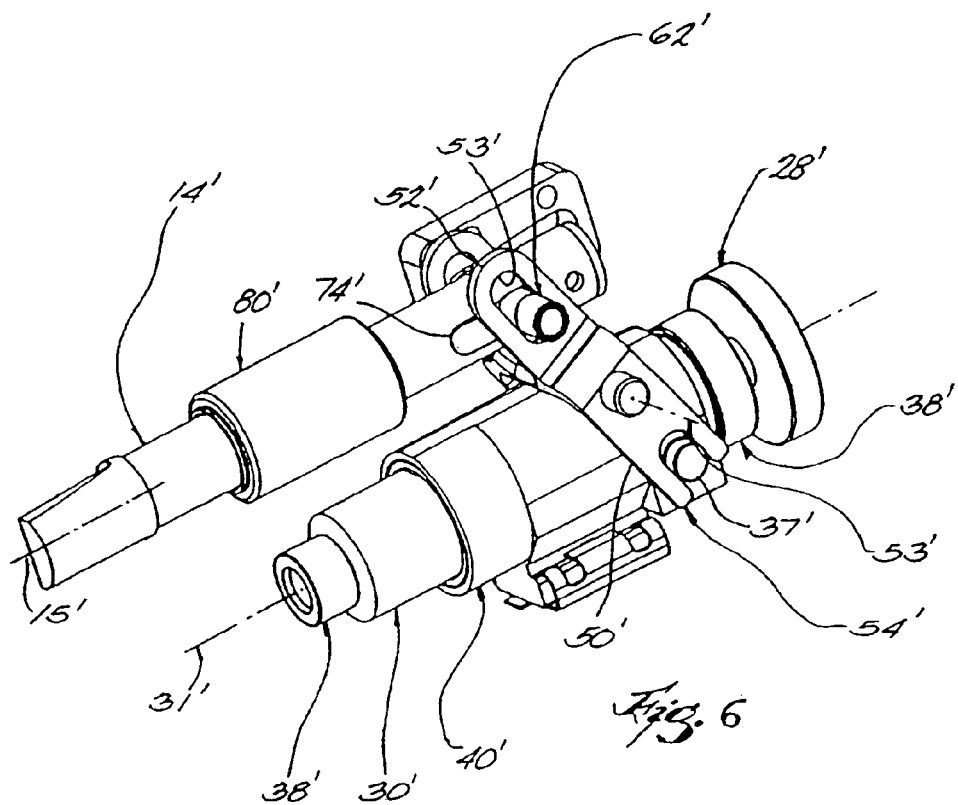
FIG. 6 is a perspective view of a portion of another embodiment of the reciprocating drive assembly.
Figure 7:
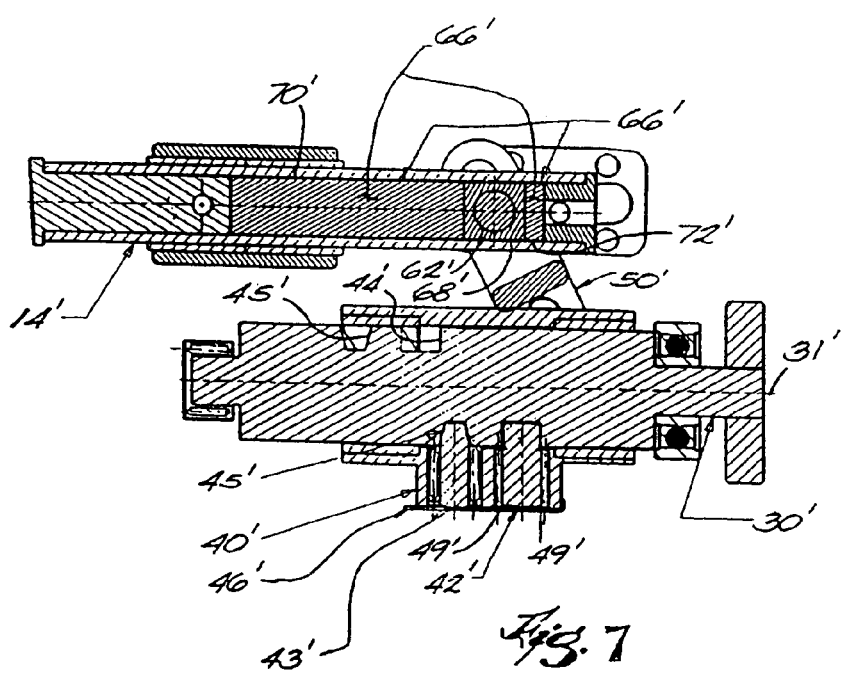
FIG. 7 is a side view, in cross-section, of the reciprocating drive assembly portion of FIG. 6.
Figure 8:
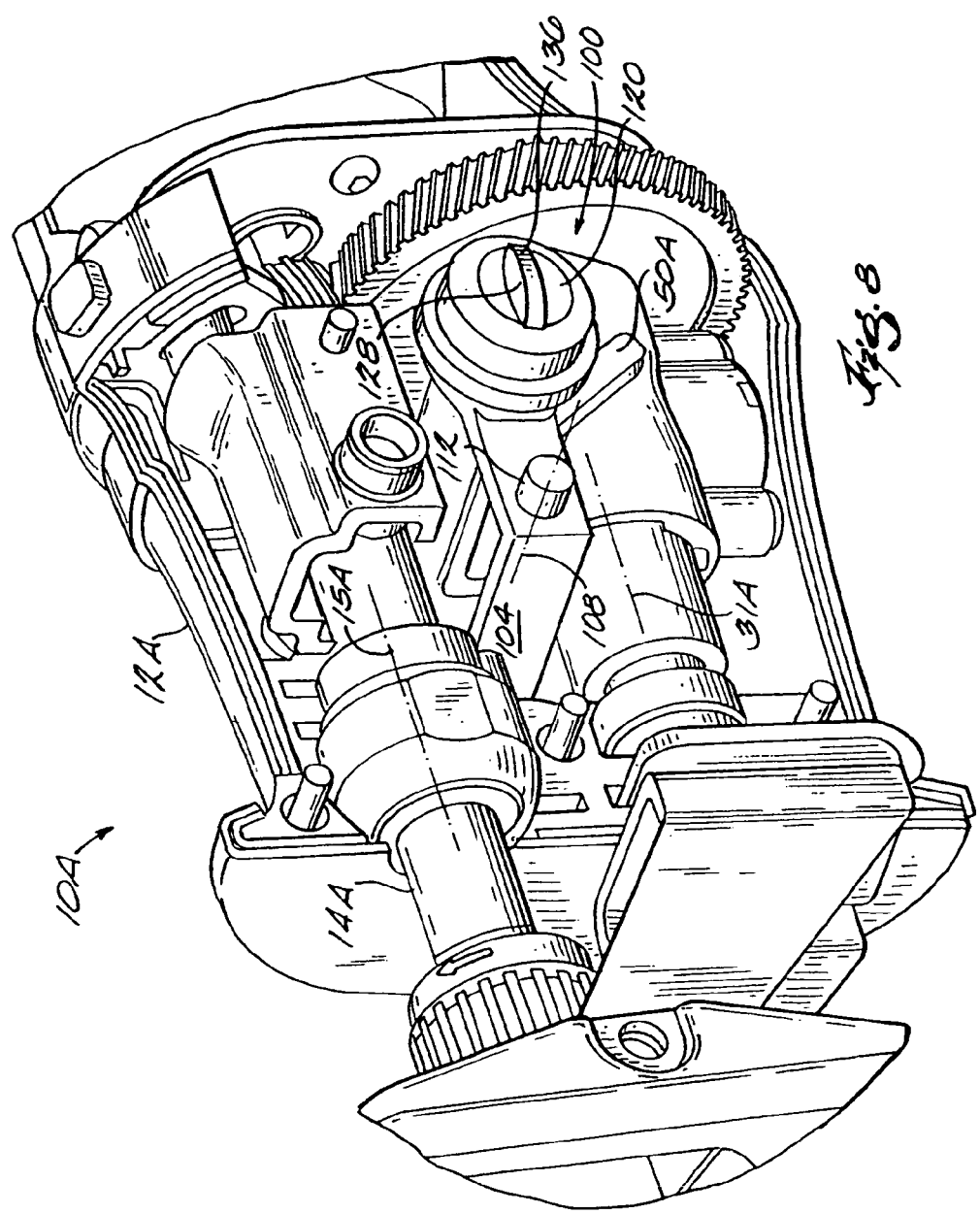
FIG. 8 is a perspective view of an alternative construction of a reciprocating saw according to the present invention, shown in partial cross-section.

In the second embodiment, shown in FIGS. 6 and 7, the arrangement of the interconnection between pivot body 50' and spindle 14' is different. The pivot body 50' is generally X-shaped, having two portions on both the first end 52' and the second end 54'. The first end 52' engages the spindle pin 62' on both sides of the spindle 14'. The first end 52' of the pivot body 50' is shown as having closed slots 53', instead of an open slot as shown in the first embodiment. As long as the slots 53' are sufficiently long to engage the spindle pin 62' during the entire travel of the spindle 14', either configuration will function properly.

Figure 5:
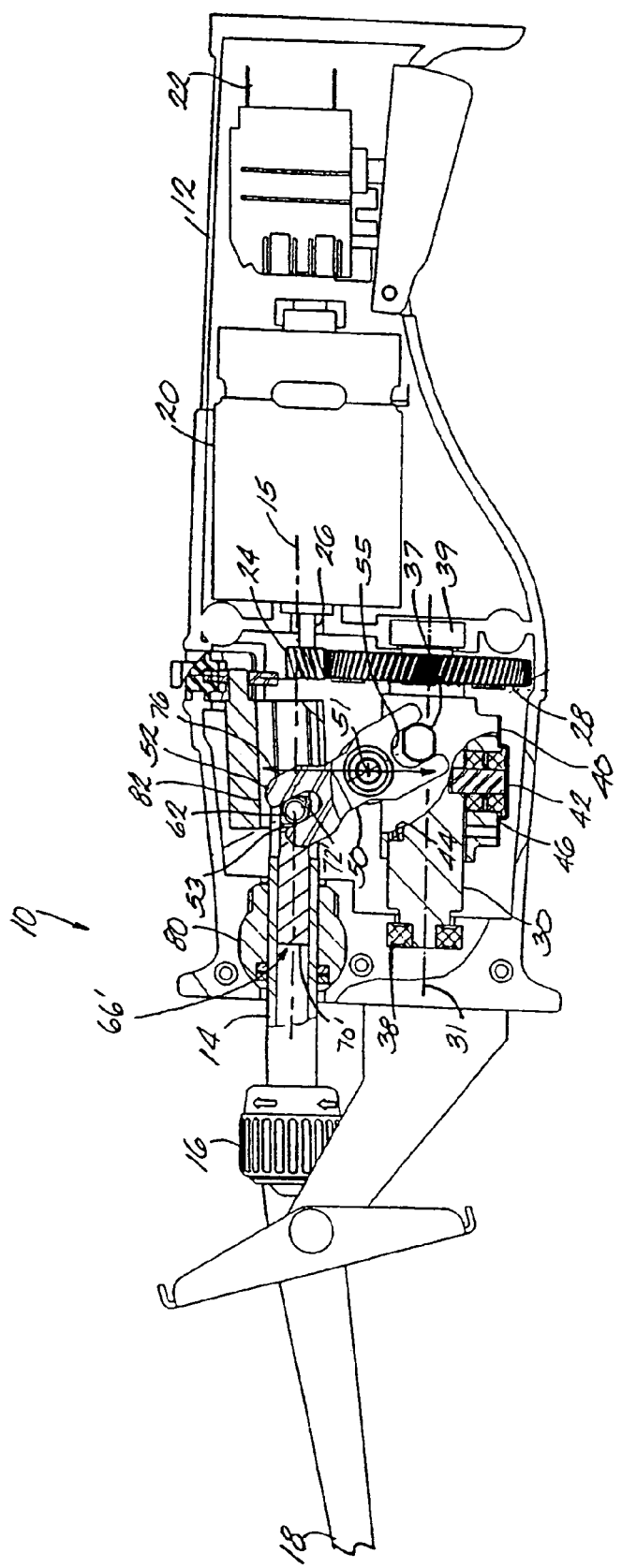
FIG. 5 is an alternative construction of the reciprocating saw shown in FIG. 1, shown in partial cross-section.

In either embodiment, the spindle pin 62 may be flexibly mounted to the spindle 14, such that a shock absorber is mounted between the spindle pin 62 and spindle 14. FIGS. 5 and 7 show, in cross section, such an arrangement in which a shock absorber 66' is made of an elastomeric, shock absorbing material, and is interconnected between the spindle pin 62 and 62', respectively, and the spindle 14 and 14', respectively.

The constructions shown in FIGS. 5 and 7 are similar and only the construction shown in FIG. 7 will be described in detail. Similar elements have the same reference number.

Because the spindle pin 62' may move relative to the spindle 14', the spindle 14' is configured to permit such movement. For example, in the configuration shown in FIGS. 6 and 7, the spindle pin 62' extends through a longitudinal slot 74' in the spindle 14', instead of through the circular aperture 64 shown in FIG. 2.

As shown in the cross section of the spindle 14' in FIG. 7, the spindle pin 62' may be connected to a pin sleeve 68' that fits in the center of the spindle 14' and has a cylindrical passage for retaining the spindle pin 62'. The pin sleeve 68' presses against the shock absorber 66', and is mounted behind front shock portion 70' and in front of rear shock portion 72'. The rear shock portion 72' may be smaller such that the shock absorption is more stiff during the cutting stroke. The shock absorber 66' provides greater shock absorption in the event that, for example, the blade 18 strikes a rigid object or is pinched during the return stroke. This increases the life of the mechanism and may prevent damage to the mechanism, as well as aiding the operator comfort.

It should be understood that the shock absorber 66' and the front and rear shock portions 70' and 72' may be formed of any type of shock absorbing material, as any type of shock absorbing member, such as, for example, a spring member, or as any combination of shock absorbing materials and/or shock absorbing members.

The spindle 14 does not, in the preferred embodiment, reciprocate only along a spindle axis 15 that is parallel to the drive axis 31. Instead, for more effective cutting, the saw blade 18 can be moved with rocker motion as described in U.S. patent application Ser. No. 08/699,448, filed Aug. 19, 1996. In short, the spindle 14 is reciprocated by moving the spindle pin 62 within a spindle track 82 having an adjustable inclination. The spindle track 82 thus provides an adjustable spindle path.

Referring to FIGS. 1 and 2, the angle of the spindle 14 may be selectively varied by adjustment of the position of spindle track 82. The spindle track 82 is pivotally mounted to the housing 12 at one end and can therefore be angled up or down. Referring to FIG. 2, a fixed end 84 includes a pair of track pins 86 that pivotally engage the housing 12. At a free end 88 of the spindle track, a pin 90 extends rearward. The pin 90 engages a slot 92 in a cam 94. The slot 92 has a shape that varies the vertical position of the pin 90 as the cam 94 rotates. The cam 94 may rotate relative to the housing. The cam 94 may be moved using a tab 96 that protrudes through the top of the housing 12. By adding frictional engagement points, the cam 94 motion can be made such that the user selects one of several positions of the cam 94. Frictional engagement between the cam 94 and the housing 12 thus keeps the cam 94 in a selected position.

In a preferred embodiment, the position of the spindle track 82 is adjustable such that the free end 88 is either at, above or below a horizontal position (as viewed in FIG. 1). Thus, the "rocker" motion can be tailored to the particular working conditions, such as the type of material and the blade used. Further, as previously mentioned, the reciprocating saw 10 of the present invention may be used for upcutting and downcutting. The motion of the saw blade 18 may be selected for optimal cutting in both upcutting and downcutting conditions.

Referring to FIGS. 1 and 2, the spindle 14 is mounted at the forward end of the reciprocating saw 10 by a spindle bushing 80. The spindle bushing 80 has a cylindrical inner surface to engage the outer surface of the spindle 14, and a spherical outer surface so as to be pivotally mounted within the housing 12. In this way, the angle of the spindle 14 relative to the housing 12 may be varied. When the reciprocating saw 10 is adjusted so that the saw blade 18 is rocking up or down, the outside of the spindle bushing 80 pivots relative to the housing 12.

As will be appreciated by one skilled in the art, in the illustrated embodiment the reciprocator body 40 both translates force from the drive shaft 30 to the spindle 14, and also reciprocates in a direction largely opposed to the direction of the spindle 14, thereby counterbalancing the reciprocating saw 10. Thus, the reciprocator body 40 is both a driving mechanism and a counterweight at the same time, without additional mechanisms or complexity. It can be seen that a drive force path exists from the motor 20, through motor pinion 24 and drive gear 28, through drive shaft 30, through reciprocator body 40, through pivot body 50, through spindle 14, and finally to saw blade 18. The portion of the reciprocator body 40 that is truly essential for operation of the saw 10 is the portion around drive shaft 30, around groove 44, and that contacts the pivot body 50 (i.e., at reciprocator pin 37). Any additional mass of the reciprocator body 40 serves to reinforce the structure and to provide a counterweight. Because the travel of the spindle 14 and the reciprocator body 40 may be determined by the geometry of the mechanism, the reciprocator body 40 may be designed to provide an inertial force that substantially balances the spindle 14 and therefore the reciprocating saw 10.

More particularly, during the cutting stroke, typically when the saw blade 18 is being retracted, the spindle 14 is travelling along a substantially rearward path. Adjustment of the spindle track 82 moves the path of travel of the spindle 14 and saw blade 18 somewhat, but still the travel is still largely rearward. While the spindle 14 is retracting, the reciprocating member 40 is travelling along a path in a forward direction and parallel to the drive axis 31. Thus, a substantial vector component of the direction of travel of the saw blade 18 and the spindle 14 will be opposed to the direction of travel of the reciprocating member 40 during the cutting stroke. If the spindle 14 is adjusted to reciprocate longitudinally along the spindle axis 15, then the travel will be exactly opposed. During the return stroke, the path of travel of the spindle 14 and the reciprocating member will be exactly the same as the extending stroke, but the components are moving in the opposite direction.

An additional benefit of the invention is that the configuration of the drive mechanism of the reciprocating saw 10 permits adjustment of the length of travel of the spindle 14 and thus the saw blade 18. This may be accomplished by varying the position of pivot axis 51. More specifically, pivot axis 51 can be varied up or down as indicated by arrows 76 in FIG. 1, in a direction perpendicular to the drive axis 31 and the spindle axis 15 in order to vary the travel of the spindle 14. Different housings 12 could be created with different pivot axis 51 positions, or the pivot axis 51 position could be made selectively adjustable with a housing 12 having the pivot pin 58 and bushings 60 being movable to different positions and fastenable at a selected position.

FIG. 8–11 illustrate an alternative construction of a reciprocating saw 10A embodying the invention. Common elements are identified by the same reference number "A".

FIG. 8–11 illustrate, in more detail, a construction for supporting the pivot pin 58A, defining the pivot axis 51A of the pivot body 50A, for movement relative to the housing 12A and for adjusting the position of the pivot pin 58A relative to the housing 12A. The illustrated construction may be used in either of the embodiments described above.

In the illustrated construction (see FIG. 8–10), the pivot pin 58A is movable up or down as indicated by the arrows 76A, in a direction generally perpendicular to the drive axis 31A and to the spindle axis 15A, to vary the length of travel or stroke length of the spindle 14A. In the illustrated construction, the reciprocating saw 10A also includes a pivot axis adjustment assembly 100 to adjustably support the pivot pin 58A for movement relative to the housing 12A to change the stroke length of the spindle 14A.

The adjustment assembly 100 includes a pin support member 104 pivotably supported by the housing 12A for pivoting movement about a support member axis 108 defined by support member projections 112 engaging the housing 12A. The generally C-shaped pin support member 104 supports the ends of the pivot pin 58A and the bushings 60A and defines an adjustment slot 116

The adjustment assembly 100 also includes an adjustment actuator 120 pivotably supported by the housing 12A and operatively connected to the pin support member 104. The adjustment actuator 120 includes an eccentric adjustment pin 124, engaging the adjustment slot 116, and a knob 128.

In operation, the adjustment assembly 100 is adjustable to move the pivot pin 58A between a first position (shown in solid lines in FIG. 9), in which the spindle 14A has a first stroke length L1, and a second position (shown in phantom lines in FIG. 9), in which the spindle 14A has a second stroke length L2. As the knob 128 is rotated by an operator (for example, in a counterclockwise direction in FIG. 9), the eccentric adjustment pin 124 moves in the adjustment slot 116, causing the pin support member 104 to pivot about the support member axis 108. In the illustrated construction, as the pin support member 104 pivots relative to the housing 12A, the pivot pin 58A is moved upwardly as indicated by the arrow 76A relative to the housing 12A to change the position of the pivot axis 51A relative to the housing 12A. In the illustrated construction, rotation of the knob 128 in the opposite, clockwise direction results in movement of the pivot pin 58A downwardly relative to the housing 12A. In the illustrated construction, the stroke length of the spindle 14A is infinitely adjustable between a minimum stroke length (for example, L2), resulting from the uppermost position of the eccentric adjustment pin 124, and a maximum stroke length (for example, L1), resulting from the lowermost position of the eccentric adjustment pin 124.

The relative position of the pivot pin 58A (and the pivot axis 51A) relative to the reciprocator pin 37A and the spindle pin 62A defines the stroke length of the spindle 14A. In the first position, the pivot pin 58A (and the pivot axis 51A) is a first distance from the reciprocator pin 37A and a first distance from the spindle pin 62A, resulting in the first stroke length L1 of the spindle 14A. In the second position, the pivot pin 58A (and the pivot axis 51A) is a greater distance from the reciprocator pin 37 and a lesser distance from the spindle pin 62A, resulting in the second stroke length L2, which is shorter than the first stroke length L1.

It should be understood that, in other constructions (not shown), the pivot pin 58A may be supported in a different manner for movement relative to the housing 12A to adjust the stroke length of the spindle 14A. For example, in another construction (not shown), a pin support member (similar to the pin support member 104) may be supported for sliding movement relative to the housing 12A (for example, generally perpendicular to the drive axis 31A and to the spindle axis 15A), rather than for pivoting movement, to adjust the position of the pivot pin 58A relative to the housing 12A.

Also, in yet another construction (not shown), a different adjustment actuator may be provided to move a pin support member or to move the pivot pin 58A. For example, a sliding actuator (similar to the cam 94 in the rocker motion assembly) may be used to adjust the position of the pivot pin 58A relative to the housing 12A.

Figure 10:
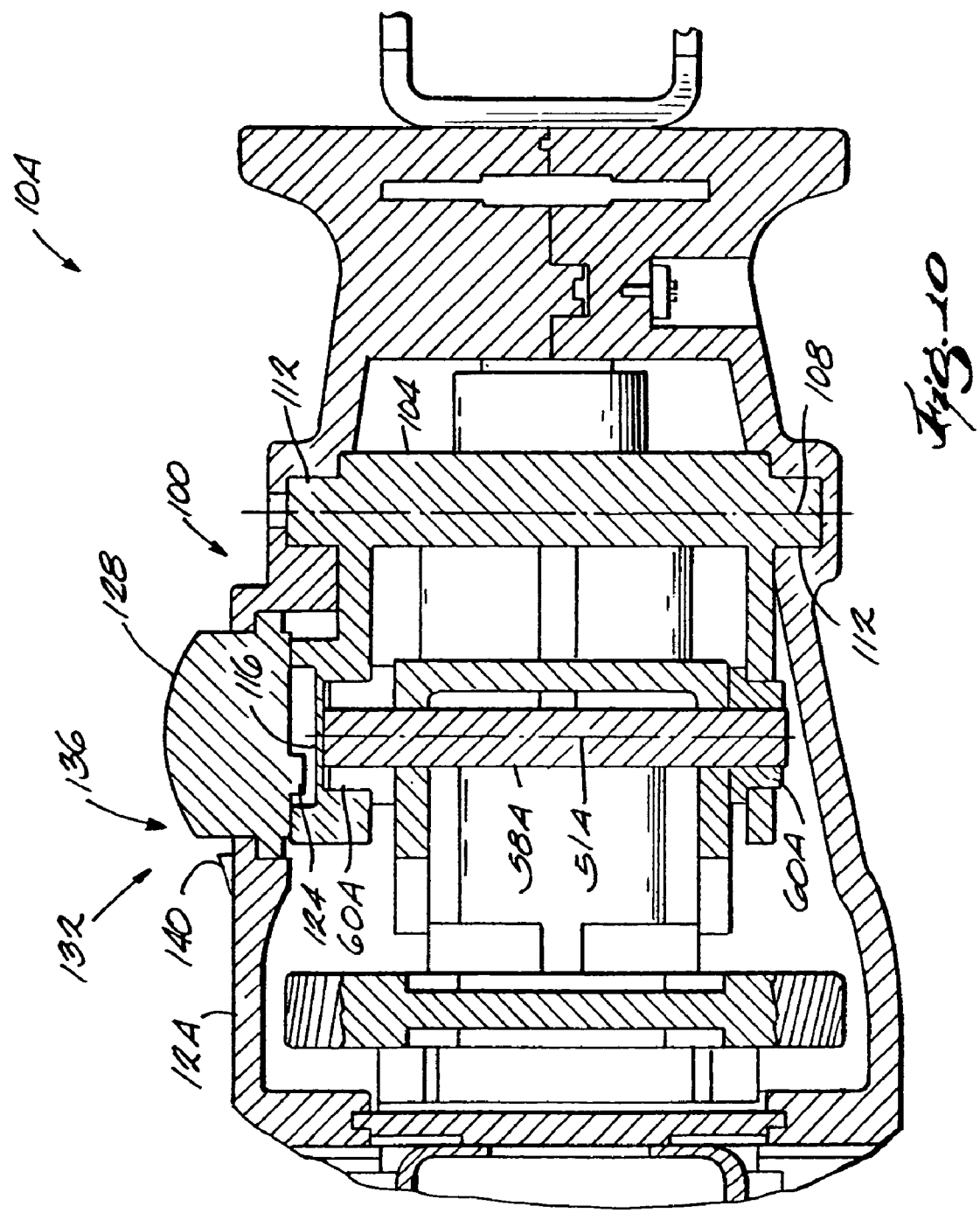
FIG. 10 is a cross-sectional view along line 10—10 in FIG. 9.
Figure 11:
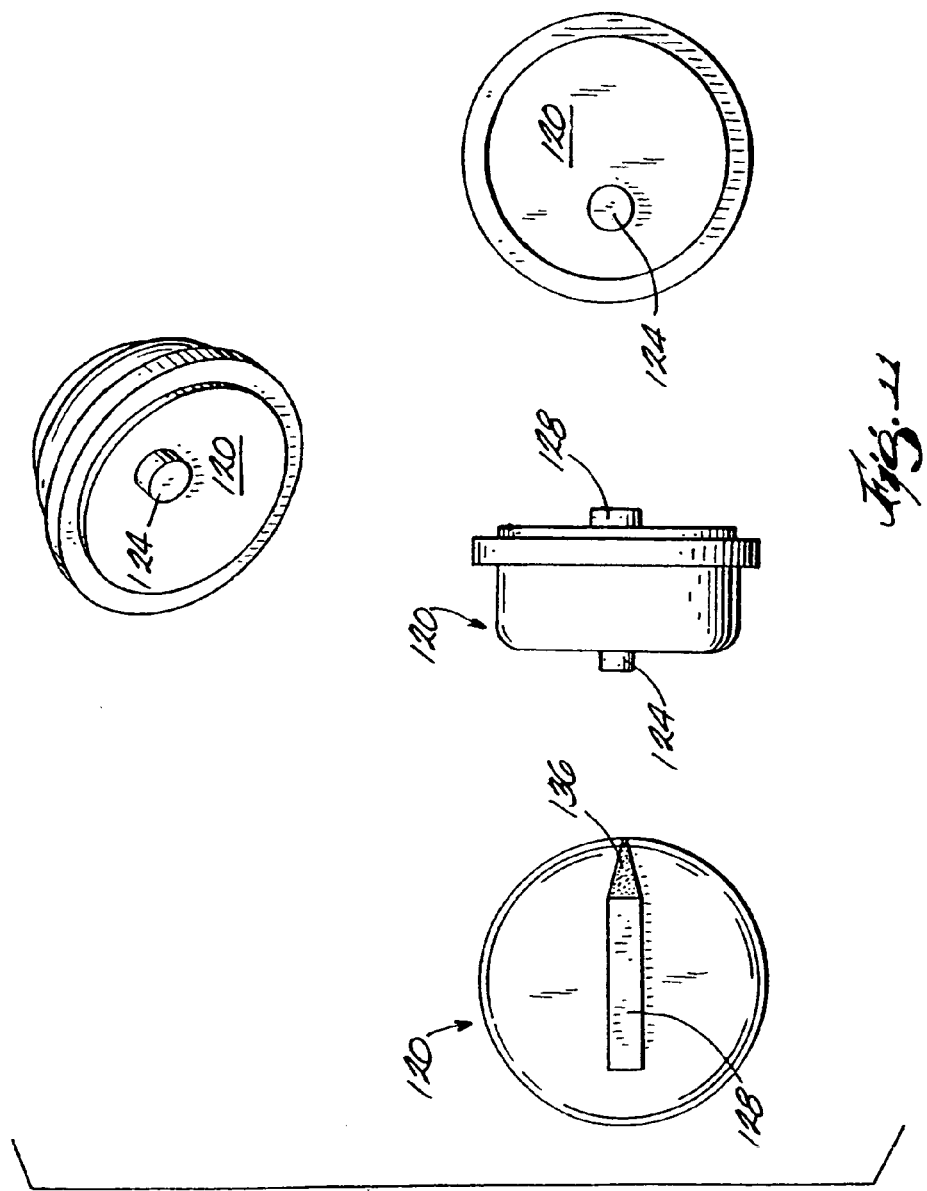
FIG. 11 are several views of the adjustment actuator shown in FIG. 8–10.

The adjustment assembly 100 also includes an indicator arrangement 132 for indicating the adjusted position of the pivot pin 58A and the resulting stroke length of the spindle 14A. As shown in FIG. 10, the indicator arrangement 132 includes a first indicator member 136 on the knob 128 and a plurality of second indicator members 140 (one shown) on the housing 12A.

In the first position of the pivot pin 58A (shown in solid lines in FIG. 9 and in FIG. 10), the first indicator member 136 is aligned with one of the second indicator members 140 (shown in FIG. 10) to indicate the first stroke length of the spindle 14A. In the second position of the pivot pin 58A (shown in phantom lines in FIG. 9), the first indicator member 136 is misalinged with the one of the second indicator members 140 (shown in FIG. 9) and is aligned with another of the second indicator members 140 (not shown) to indicate the second stroke length of the spindle 14A.

FIG. 12–19 illustrate an alternative construction of a reciprocating saw 10B embodying the invention. Common elements are identified by the same reference number "B".

Figure 12:
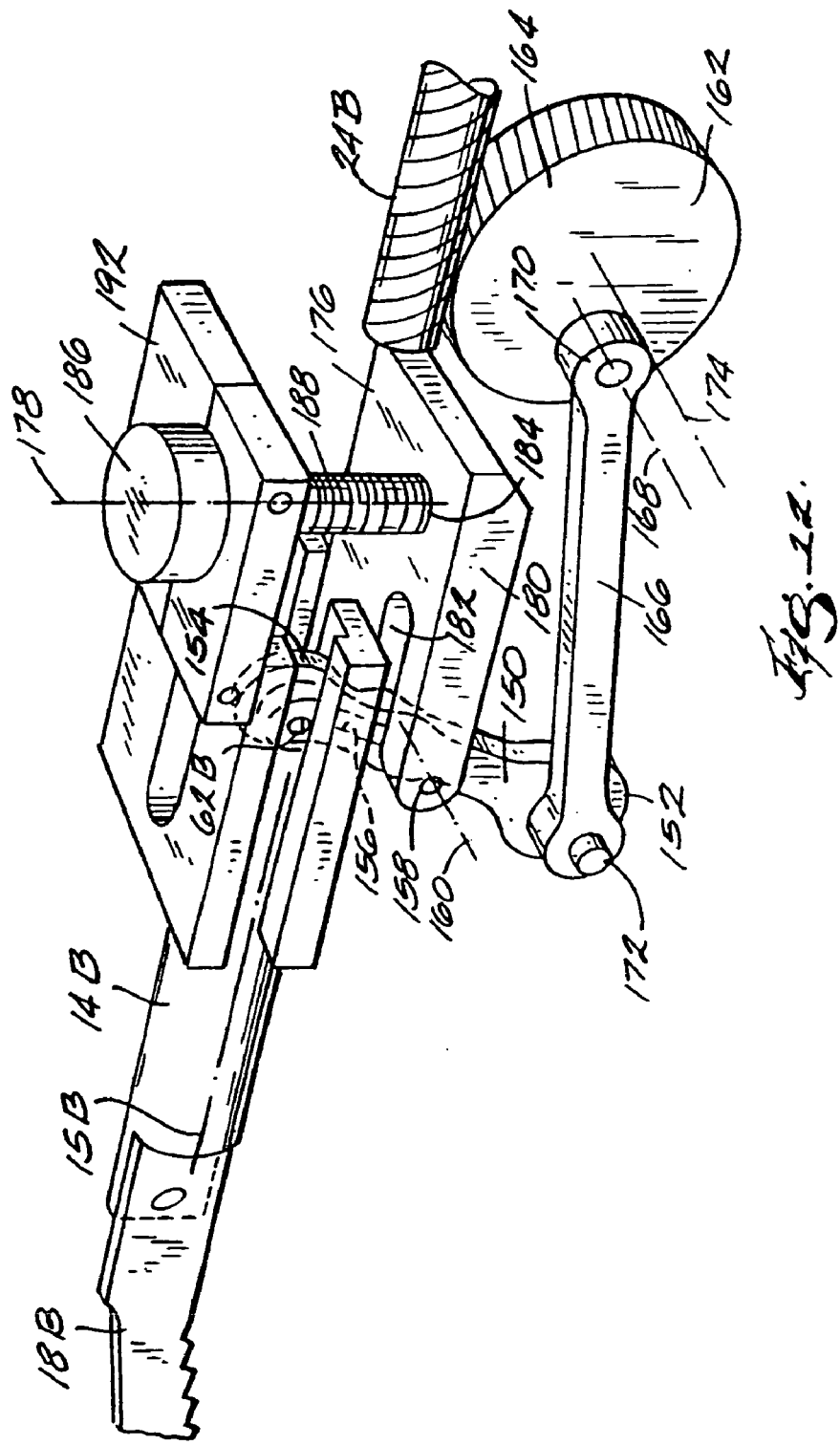
FIG. 12 is a perspective view of an alternate construction of a reciprocating saw according to the present invention.

Referring to FIG. 12, the reciprocating saw 10B includes a pivot member 150 or pivot body having a driven end 152 and a drive end 154. The driven end 152 is pivotally connected to a drive mechanism to be driven by a motor 20B. The drive end 154 includes a closed slot 156 extending through the pivot member 150. The slot 156 extends along a portion of the length of the pivot member 150 and is sized to receive a spindle pin 62B. The spindle pin 62B engages the spindle 14B in a manner that allows the drive end 154 of the pivot member 150 to pivot as well as translate relative to the spindle 14B. Between the driven end 152 and the drive end 154, a pivot pin 158 pivotally supports the pivot member 150 in a position relative to the housing 12B. The pivot pin 158 defines a pivot axis 160 for the pivot member 150.

The drive mechanism (to pivot the pivot member 150 and reciprocate spindle 14B) includes a rotary member 162 between the motor 20B and the pivot member 150. The rotary member 162 is a drive gear 164 rotatably supported by the housing 12B and rotatably driven by the motor pinion 24B. The drive mechanism also includes a drive arm 166 having a first end 170 engaging the drive gear 164 at an eccentric axis 168 and a second end 172 engaging the driven end 152 of the pivot member 150. The drive arm 166 is pivotally connected to both the pivot member 150 and the drive gear 164.

In operation, the motor 20B rotates the motor pinion 24B, and rotation of the motor pinion 24B causes rotation of the drive gear 164 about the rotary axis 174. As the first end 170 of the drive arm 166 engages the eccentric axis 168 of he drive gear 164, the second end 172 reciprocates the driven end 152 of the pivot member 150, translating the rotary motion of the motor 20B and the drive gear 164 into reciprocating motion of the pivot member 150.

The pivot member 150 reciprocally pivots about the pivot axis 160, the drive end 154 and driven end 152 moving in substantially opposite directions along arcs centered on the pivot axis 160. The spindle pin 62B and the spindle 14B reciprocate with the drive end 154 along the spindle axis 15B by both pivoting and translating relative to the drive end slot 156 in response to the reciprocation of the pivot member 150.

It should be understood that, in other constructions (not shown), the reciprocating saw 10B may include another drive mechanism to pivot the pivot member 150, such as, for example, the reciprocator body 40 (described above) or other structure to convert the rotary motion of the motor 20B to pivoting motion of the pivot member 150.

While, in the illustrated construction, the rotary member 162 is a drive gear 164, it should be understood that, in other constructions (not shown), other drive structure may be provided to replace the drive gear 164. In such constructions, the drive structure may include a disk or another toothless rotating member.

An adjusting assembly 176 supports the pivot pin 158 for movement relative to the housing 12B. The adjusting assembly 176 is operable between a first condition, in which the spindle 14A is reciprocable through a first stroke length, such as a maximum stroke length (see FIG. 14–15), and a second condition, in which the spindle 14A is reciprocable through a second stroke length, such as a minimum stroke length (see FIG. 16–17).

Operation of the adjusting assembly 176 moves the pivot pin 158 along an adjusting axis 178 that is substantially perpendicular to the pivot axis 160. Movement of the pivot pin 158 along the adjusting axis 178 varies the distance between the pivot pin 158 and the spindle pin 62B (the drive length) resulting in the varying stroke lengths. With a fixed driven length, a shorter distance between the pins 158 and 62B produces a shorter stroke length. The slot 156 in the drive end 154 of the pivot member 150 allows the spindle pin 62B to slide relative to the drive end 154 of the pivot member 150 to vary the distance between the pins 158 and 62B.

Figure 13:
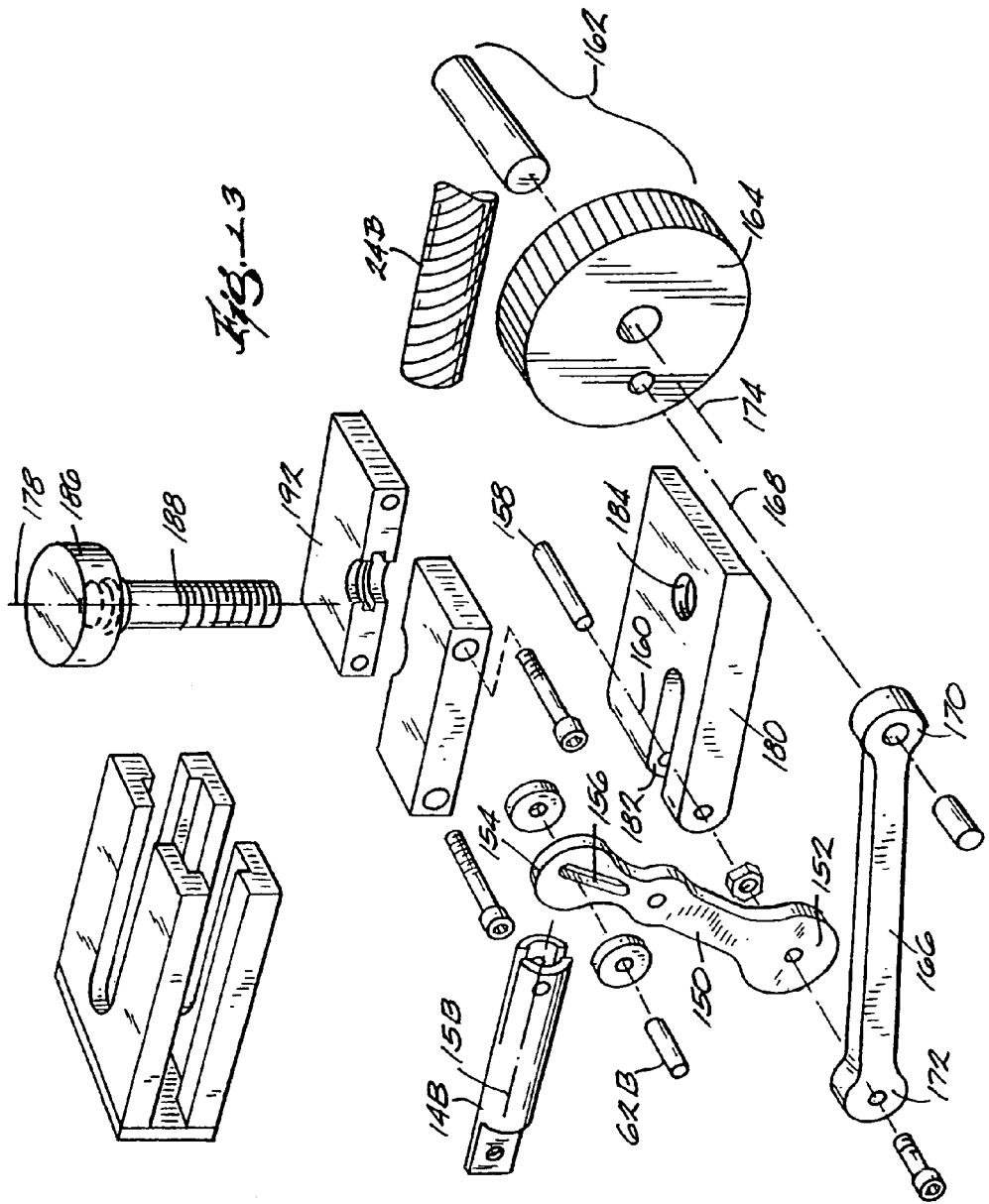
FIG. 13 is an exploded perspective view of the reciprocating saw of FIG. 12.

As shown in FIG. 13, the adjusting assembly 176 includes a support member 180. The support member 180 includes an elongated slot 182 extending through the support member 180 from the top surface to the bottom surface and from one side surface partially through toward the opposite side surface, thus defining a slot 182 with one open end. The width of the slot 182 accommodates the pivot member 150 and any desired spacers, while still allowing free pivotal movement of the pivot member 150 about the pivot pin 158. The pivot pin 158 extends through a bore near the open end of the slot 182 and engages the pivot member 150. The support member 180 also provides a threaded hole 184 extending through the support member 180 from the top surface to the bottom surface.

The adjusting assembly 176 also includes an actuator 186 threaded into the threaded hole 184 of the support member 180. The actuator 186 includes a screw 188 having a handle on one end and defines the adjusting axis 178 extending along the longitudinal axis of the screw 188. The actuator 186 passes through an aperture in the housing 12B (shown in FIG. 14–19) and movably engages the support member 180.

The actuator 186 is rotatable about the adjusting axis 176 and prevented from moving along the adjusting axis 176 by a separate restraint structure 192 (or by engagement with the housing 12B). Rotation of the actuator 186 about the adjusting axis 176 moves the support member 180 and the pivot pin 158 along the adjusting axis 178, changing the position of the pivot pin 158 and pivot axis 160 relative to the housing 12B and relative to the spindle pin 62B. Movement of the pivot pin 158 thus changes the stroke length of the spindle 14B.

In the illustrated construction, the actuator restraint 192 is fixed to the housing 12B (or is formed as part of the housing 12B) and supports the actuator 186. In the construction shown FIG. 13, the actuator 186 has a shoulder which engages a slot in the actuator restraint 192 to prevent movement of the actuator 186 along the adjusting axis 176. It should be understood that, in other constructions (not shown), other actuator restraints, such as that shown in FIG. 8–11, may be used.

The support member 180 is guided by the housing 12B for movement along the adjusting axis 178, while preventing unwanted movement. In the construction shown in FIG. 14–19, the support member 180 engages a key 194 fixed to the housing 12B. The key 194 prevents motion of the support member 180 in all directions other than along the adjusting axis 176. It should be understood that, in other constructions (not shown), other structures, such as rods, supports, or guides, may be used to guide movement of the support member 180 along the adjustment axis 178.

The pivot pin 158 divides the pivot member 150 into two sections, the driven section 196 (between the drive gear 164 and the pivot pin 158) and the drive section 198 (between the pivot pin 158 and the spindle pin 62B. In the illustrated construction, the driven section 196 has a fixed length, extending from eccentric axis 168 to the pivot axis 160, and the drive section 198 has a variable length, extending from the pivot axis 160 to the spindle pin 62B. The variation in stroke length is achieved by changing the length of the drive section 198 relative to the length of the driven section 196.

Also, the distance between the eccentric axis 168 and the rotary axis 174 is fixed. Fixing this distance (and the length of the drive section 196) results in a reciprocating motion of the driven end 152 of the pivot member 150 through a substantially fixed arc length. To vary the stroke length, the mechanism varies the length of the drive section 198 by moving the pivot pin 158 along the adjusting axis 178.

While, in the illustrated construction the length of the drive section 198 is variable, in other constructions (not shown), the length of the driven section 196 may be varied to change the stroke length. In yet other constructions (not shown), the lengths of both the drive section 198 and driven section 196 may be varied to change the stroke length.

FIG. 14–19 illustrate the reciprocating saw 10B with the spindle 14B and the saw blade 18B in the forward position or in the rearward position of a stroke in a selected stroke length.

Figure 14:
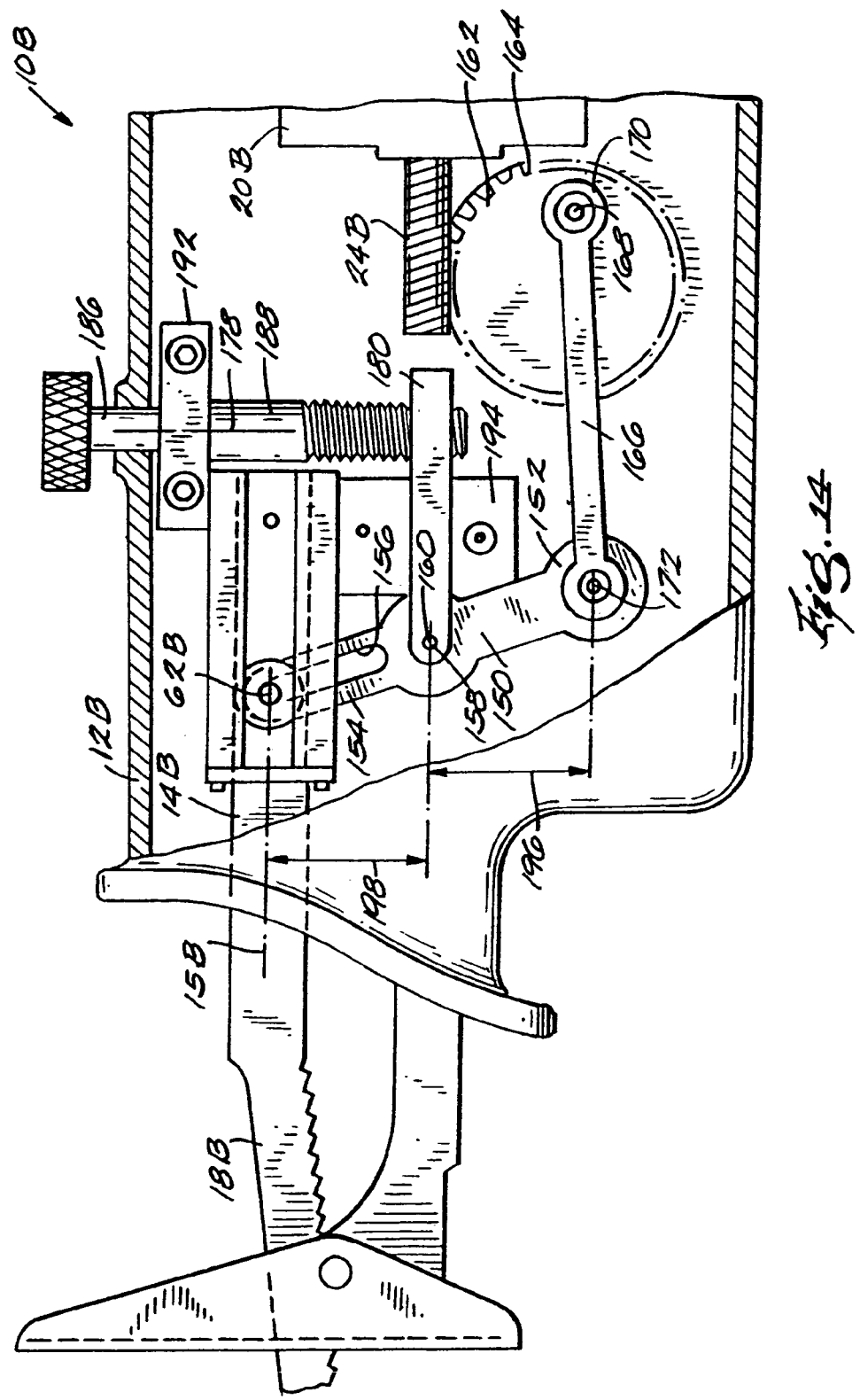
FIG. 14 is a side view of the reciprocating saw of FIG. 12 configured for a maximum stroke length, with the spindle in its forward position.

FIG. 14 shows the spindle 14B and the saw blade 18B in its forward position with the stroke length adjusted to a first stroke length, such as the maximum stroke length. In this position, the eccentric axis 168 is rotated toward its rearward position, forcing the drive arm 166 to pull the driven end 152 of the pivot member 150 toward the rear of the housing 12B. This pivots the drive end 154 toward the front of the housing 12B, resulting in the forward position of the spindle 14B and saw blade 18B.

Figure 15:
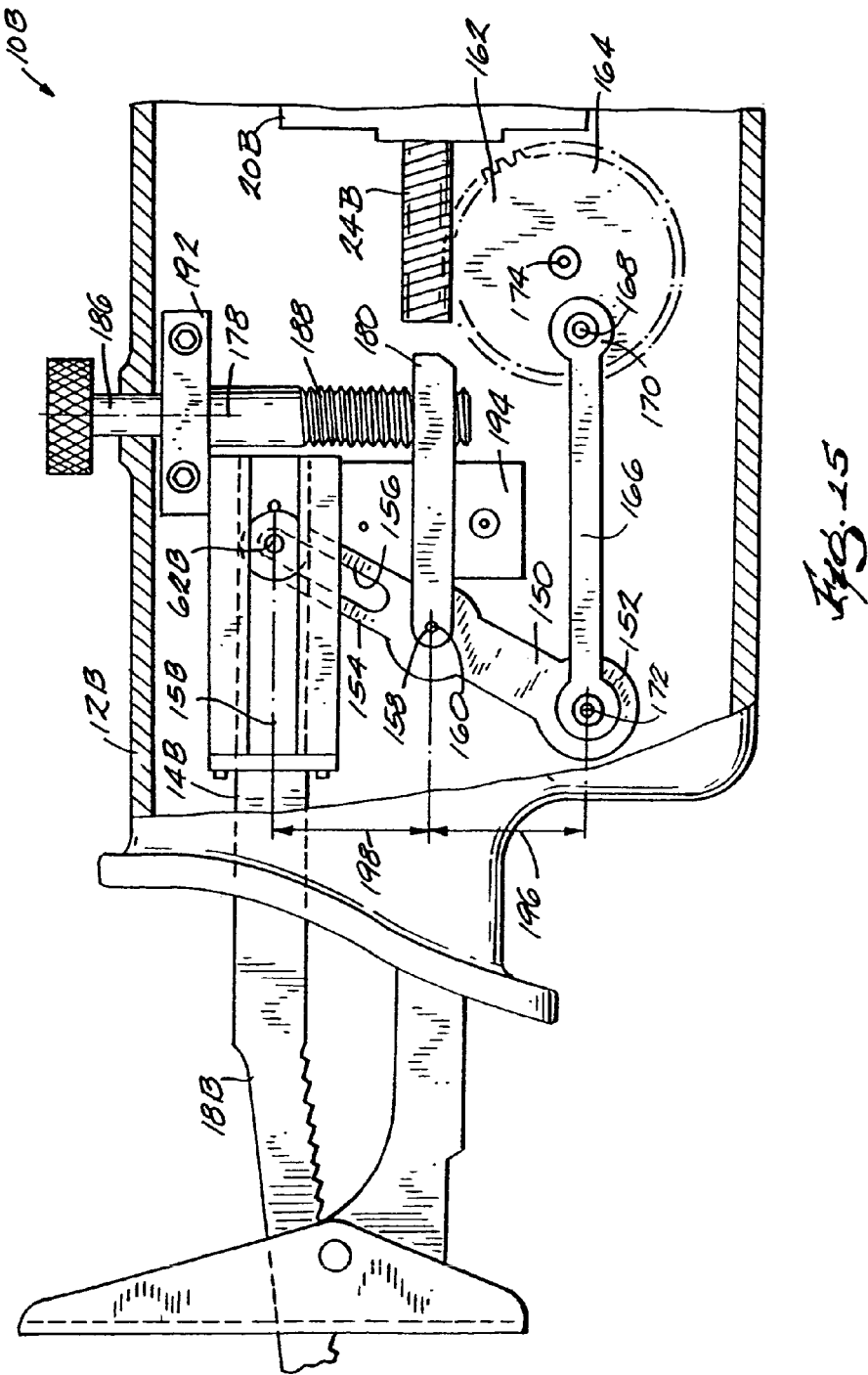
FIG. 15 is a side view of the reciprocating saw of FIG. 12 configured for a maximum stroke length, with the spindle in the rearward position.

FIG. 15 shows the reciprocating saw 10B in the configuration shown in FIG. 14 with the spindle 14B in the rearward position. After approximately one-half of a revolution of the drive gear 164, the eccentric axis 168 is rotated to the opposite side of the rotary axis 174, and the driven end 152 of the pivot member 150 has moved to its forward position. The drive end 154 of the pivot member 150 and the spindle 14B are thus retracted to the respective rearward positions (when compared to FIG. 14). The length of the drive section 198, the length of the driven section 196, and the distance between the eccentric axis 168 and rotary axis 174 are all constant during operation between the positions shown in FIG. 14–15.

Figure 17:
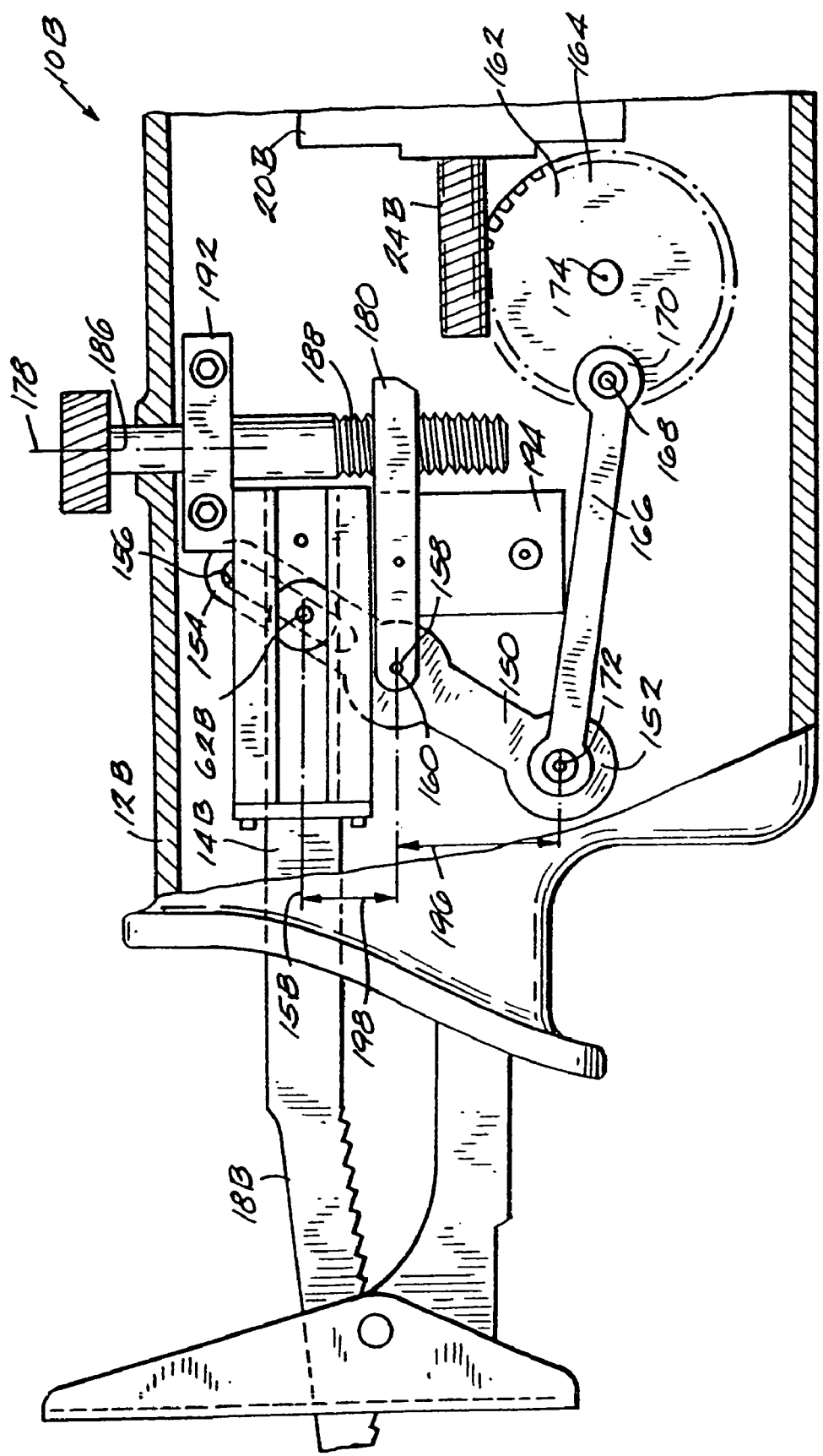
FIG. 17 is a side view of the reciprocating saw of FIG. 12 configured for a minimum stroke length, with the spindle in the rearward position.
Figure 16:
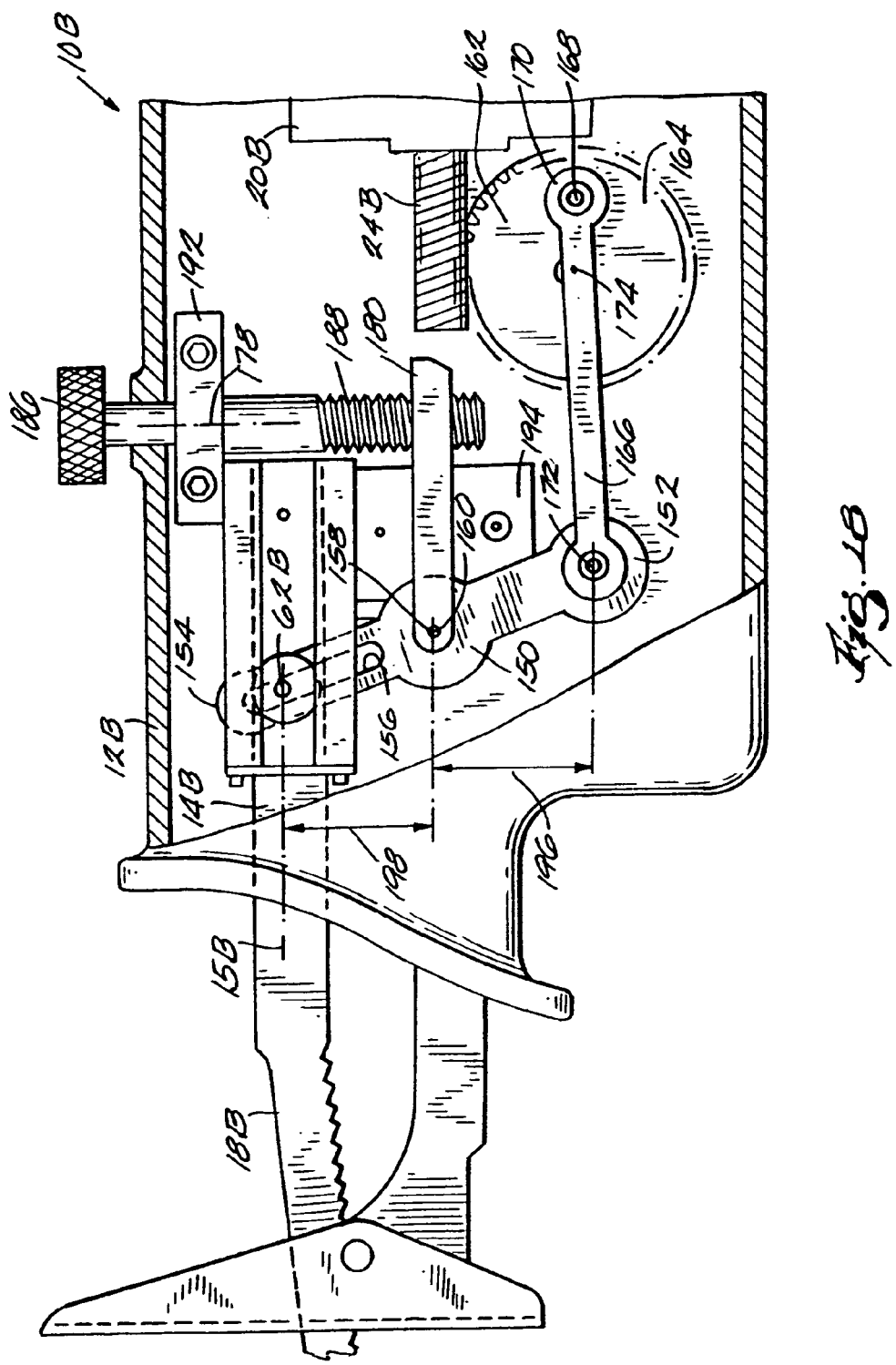
FIG. 16 is a side view of the reciprocating saw of FIG. 12 configured for a minimum stroke length, with the spindle in the forward position.

FIG. 16–17 illustrate the reciprocating saw 10B with the spindle 14B and the saw blade 18B in the forward position and in the rearward position, respectively, and configured for a second stroke length, such as the minimum stroke length. The distance between the eccentric axis 168 and the rotary axis 174 and the length of the driven section 196 have remained constant (in relation to FIG. 14–15). However, the length of the drive section 198 has been shortened. This positioning results in a shorter stroke length. The spindle pin 62B engages the pivot member 150 at a point nearer to the pivot pin 158, and the movement of the pivot member 150 through a substantially constant angle about the pivot pin 158 results in a shorter stroke length due to the shorter arc being followed by the spindle pin 62B.

To move the pivot pin 158 closer to the spindle pin 62B (to shorten the stroke length), a user rotates the actuator 186 in one direction, which moves the support member 180 and the pivot pin 158 along the adjusting axis 178 towards the spindle pin 62B. To increase the stroke length (and move the pivot pin 158 farther from the spindle pin 62B), the user rotates the actuator 186 in the opposite direction, which moves the support member 180 and the pivot pin 158 along the adjusting axis 178 away from the spindle pin 62B. In this manner, any stroke between the minimum (shown in FIG. 16–17) and the maximum (shown in FIG. 14–15) can be achieved.

FIG. 17 illustrates the reciprocating saw 10B in the configuration shown in FIG. 16 with the spindle 14B in the rearward position. After approximately one-half of a revolution of the drive gear 164, the eccentric axis 168 is rotated to the opposite side of the rotary axis 174, and the driven end 152 of the pivot member 150 has moved to its forward position. The drive end 152 of the pivot member 150 and the spindle 14B are thus retracted to the respective rearward position (when compared to FIG. 16). The length of the drive section 198, the length of the driven section 196, and the distance between the eccentric axis 168 and rotary axis 174 are all constant during operation between the positions shown in FIG. 16–17.

FIG. 18–19 illustrate the reciprocating saw 10B with the spindle 14B and the saw blade 18B in the forward position and in the rearward position, respectively, and configured for a third stroke length, such as an intermediate stroke length between the maximum stroke length (shown in FIG. 14–15) and the minimum stroke length (shown in FIG. 16–17).

With the exception of the length of the drive section 198 of the pivot member 150, the position of the components in FIG. 18 is similar to that in FIGS. 14 and 16, and the position of the components in FIG. 19 is similar to that in FIGS. 15 and 17. In FIG. 18–19, the position of the support member 180 and the pivot pin 158 is between the position shown in FIG. 14–15 and FIG. 16–17, resulting in a length of the drive section 198 between the lengths shown in FIG. 14–15 and FIG. 16–17. This results in a stroke length between the first stroke length (FIG. 14–15) and the second stroke length (FIG. 16–17).

It should be understood that the position of the support member 180 and the pivot pin 158 is adjustable to any position from the position shown in FIG. 14–15 to the position shown in FIG. 16–17. Corresponding varied stroke lengths are provided at the adjusted position of the support member 180 and the pivot pin 158 so that the stroke length is adjustable to any stroke length between the maximum stroke length (shown in FIG. 14–15) and the minimum stroke length (shown in FIG. 16–17).

An indicator arrangement (not shown but similar to the indicator arrangement 132) may be provided to indicate the stroke length of the spindle 14B.

While several embodiments of the present invention have been shown and described, alternative embodiments will be apparent to those skilled in the art and are within the intended scope of the present invention. Therefore, the invention is to be limited only by the following claims:

We claim:

1. A reciprocating saw comprising:
a housing;

a spindle mounted for reciprocation relative to the housing, the spindle having a front end adapted to support a saw blade;

a motor for moving the spindle in a reciprocating fashion;

a shock absorber mounted on the spindle and operatively positioned between the motor and the front end to at least partially absorb impact to the front end;

a pivot body pivotally supported by the housing, the pivot body having a first end interconnected with the spindle and a second end interconnected with the motor; and wherein the pivot body is supported by a pivot pin between the first end and the second end, the pivot pin defining a pivot axis;

wherein the spindle is driven to an extent, and wherein the pivot pin is movable perpendicular to the pivot axis to thereby vary the extent to which the spindle is driven.

2. A reciprocating saw comprising:

a housing;

a spindle mounted for reciprocation relative to the housing, the spindle having a front end adapted to support a saw blade;

a motor for moving the spindle in a reciprocating fashion;

a shock absorber mounted on the spindle and operatively positioned between the motor and the front end to at least partially absorb impact to the front end;

a pivot body pivotally supported by the housing, the pivot body having a first end interconnected with the spindle and a second end interconnected with the motor; and wherein the pivot body is supported by a pivot pin between the first end and the second end, the pivot pin defining a pivot axis;

wherein the spindle has a stroke length, and wherein the pivot pin is movable perpendicular to the pivot axis to change the stroke length of the spindle.

3. A reciprocating saw comprising:

a housing;

a motor supported by the housing;

a spindle mounted for reciprocation relative to the housing, the spindle having a front end adapted to support a saw blade;

a drive mechanism connected between the motor and the spindle and operable to reciprocate the spindle; and a shock absorber operatively positioned between the drive mechanism and the front end to at least partially absorb impact to the front end;

wherein the drive mechanism includes a pivot body pivotally supported by the housing, the pivot body having a first end interconnected with the spindle and a second end interconnected with the motor, the shock absorber being between the front end and the first end;

wherein the pivot body is supported by a pivot pin between the first end and the second end, the pivot pin defining a pivot axis;

wherein the spindle has a stroke length, and wherein the pivot pin is movable perpendicular to the pivot axis to change the stroke length of the spindle.

4. A reciprocating saw comprising:

a housing;

a motor supported by the housing;

a spindle mounted for reciprocation relative to the housing, the spindle having a front end for supporting a saw blade and being movable through a cutting stroke and a return stroke, the cutting stroke having a stroke length;

a pivot body connected between the motor and the spindle, the pivot body being driven by the motor to reciprocate the spindle, the pivot body being pivotable relative to the housing about a pivot pin defining a pivot axis, the pivot pin having a position relative to the housing, the position of the pivot pin being selectively adjustable relative to the housing to vary the stroke length of the spindle; and a shock absorber positioned between the front end and the pivot body to at least partially absorb impact to the front end.

* * * * *